United States Patent
Balachandran et al.

(10) Patent No.: US 7,385,951 B2
(45) Date of Patent: Jun. 10, 2008

(54) METHODS OF TRANSMITTING AND SIGNALING OVER A REVERSE LINK IN WIRELESS SYSTEMS

(75) Inventors: Krishna Balachandran, Morganville, NJ (US); Arnab Das, Washington, DC (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1002 days.

(21) Appl. No.: 10/367,390

(22) Filed: Feb. 15, 2003

(65) Prior Publication Data

US 2004/0160959 A1 Aug. 19, 2004

(51) Int. Cl.
*H04Q 7/00* (2006.01)
(52) U.S. Cl. ............... 370/329; 370/341; 370/443; 455/450
(58) Field of Classification Search ........ 370/320–322, 370/326, 329, 331, 335, 336, 341–344, 437, 370/441–444; 455/436, 437, 442, 450, 451, 455/452.1
See application file for complete search history.

(56) References Cited

U.S. PATENT DOCUMENTS

| | | | | |
|---|---|---|---|---|
| 6,236,646 | B1 * | 5/2001 | Beming et al. ............. | 370/335 |
| 6,901,063 | B2 * | 5/2005 | Vayanos et al. ............ | 370/335 |
| 7,054,270 | B2 * | 5/2006 | Yi et al. .................... | 370/232 |
| 7,113,496 | B2 * | 9/2006 | Koo et al. .................. | 370/335 |
| 7,154,873 | B2 * | 12/2006 | Yi .............................. | 370/338 |
| 2003/0227875 | A1 * | 12/2003 | Wei et al. .................. | 370/252 |

FOREIGN PATENT DOCUMENTS

EP 1030484 A2 * 8/2000
WO WO 2005034418 A1 * 4/2005

OTHER PUBLICATIONS

Nakamura, M et al., "Adaptive Control of Link Adaptation for High Speed Downlink Packet Access (HSDPA) in W-CDMA," The 5th International Symposium on Wireless Personal Multimedia Communications. Oct. 27-30, 2002. vol. 2, pp. 382-386.*

* cited by examiner

*Primary Examiner*—Chi Pham
*Assistant Examiner*—Donald L Mills

(57) ABSTRACT

In a wireless communication system, there is a method of transmitting over a reverse link, where a medium access control layer multiplexes data from upper level layers onto transport channels that are used based on whether the user is in a scheduled transmission mode or an autonomous transmission mode. The transport channels may be mapped to one or more physical channels associated with a particular transport channel, based on whether the transport channel is dedicated for use in the scheduled or autonomous mode.

16 Claims, 3 Drawing Sheets

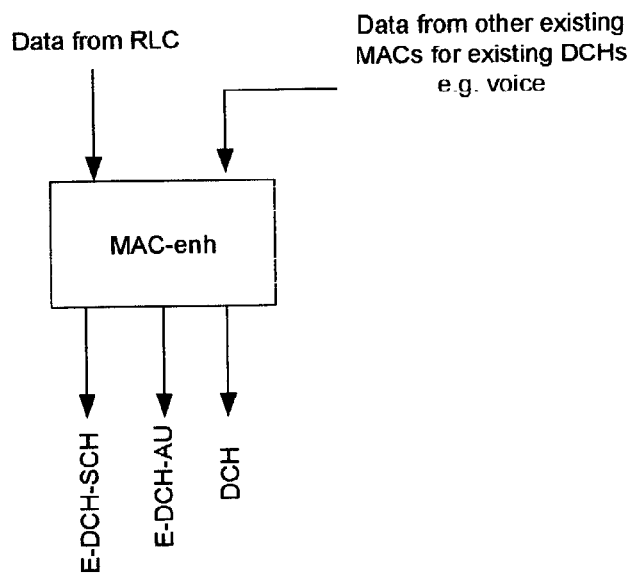
FIG. 3
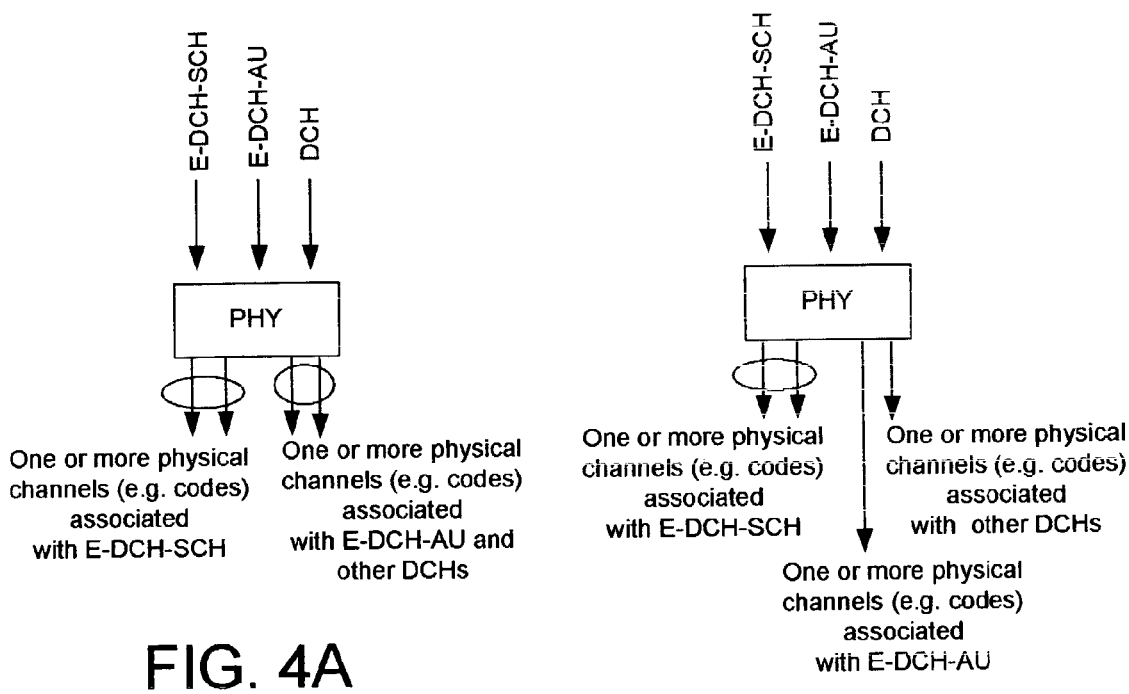
FIG. 4A
FIG. 4B

METHODS OF TRANSMITTING AND SIGNALING OVER A REVERSE LINK IN WIRELESS SYSTEMS

BACKGROUND OF THE INVENTION

1. Field of the Invention

The present invention relates to methods of transmitting and signaling over a reverse link in wireless communication systems.

2. Description of Related Art

Wireless third generation (3G) communication systems are currently introducing technologies in order to become spectrally efficient, while supporting data services, so as to provide improved multiplexing voice and multiplexing data services, for example. These efforts have resulted in the development of the 1×EV-DO and 1×EV-DV standards, an evolution of the CDMA2000 standard from the 3GPP2 body of standards. Similarly, the Universal Mobile Telecommunication System (UMTS) standard has introduced several advanced technologies, or enhancements as part of the High Speed Downlink Packet Access (HSDPA) specification. An aspect in all of these enabling technologies is to ensure that any associated control information is carried in an efficient manner.

The next generation of wireless services may be dominated by wireless data services, as opposed to current generation systems where voice telephony is the dominant service. Wireless standards are evolving to be more efficient for transport of data services by introducing several enhancements. Much of the standardization involving these enhancements to date has focused on the forward link (also known as the downlink, from base station (or Node B) to the mobile station (or user equipment (UE)). The enhancements include (i) fast scheduling to exploit channel variations; (ii) adaptive data rate selection; and (iii) Hybrid Automatic Repeat Request (H-ARQ).

Since wireless channels are typically characterized by rapid fading, scheduling of user transmissions when they experience an "up-fade" (a temporary surge in the channel quality due to fading), may greatly enhance capacity. When scheduled during an up fade, either the power can be lowered for the same data rate or, for the same power, a much higher data rate may be achieved. For data services, the latter is preferred, and may be achieved through adaptive data rate selection via adaptive modulation and coding (use of higher data rates for higher magnitude fades and lower data rates for lower magnitude fades). However, due to latencies and measurement errors, perfect estimation of the fade value (or equivalently the achievable signal-to-noise ratio) may not possible; thus the data rate selection process may be inherently error-prone and could result in high transmission error rates on the channel.

H-ARQ is a technique that lends considerable robustness to the process of adaptive rate selection. H-ARQ essentially ensures that no transmission is "wasted". If a data block is transmitted and is received in error, the data block can subsequently be retransmitted. H-ARQ provides the ability to combine the previous transmission with the retransmission and then decode the combined transmission(s), so that energy from the erroneous transmissions is not wasted.

The reverse link (UE to Node B), also known as the uplink, has several important differences to the downlink. Firstly, the uplink is a "many-transmitters-one receiver" link as opposed to the downlink, which is a "One-transmitter-many receivers" link. In the uplink direction the controlling entity may not have all the information. Secondly, in the uplink of CDMA systems, soft handoff, where a UE can communicate simultaneously with several Node Bs, when the UE is in the coverage area of those Node Bs, is freely performed. By contrast, there is a cost associated with enabling soft handoff on the forward link, since the added Node B transmitter has to be activated to transmit to the user and has to expend additional power. Thirdly, a total received power normalized by the thermal noise (also called Rise Over Thermal or RoT) is a constraint on the uplink, as RoT should be below a certain threshold. Scheduling algorithms and/or rate selection algorithms must work within this constraint. These differences give rise to many challenges in the application of the above enhancements to the uplink.

SUMMARY OF THE INVENTION

In a wireless communication system, there is a method of transmitting over a reverse link, where a medium access control layer multiplexes data from upper level layers onto transport channels that are used based on whether the user is in a scheduled transmission mode or an autonomous transmission mode. The transport channels may be mapped to one or more physical channels associated with a particular transport channel, based on whether the transport channel is dedicated for use in the scheduled or autonomous mode.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus are not limitative of the exemplary embodiments of the present invention and wherein:

FIG. 3 illustrates multiplexing performed by the MAC layer of FIG. 2 in accordance with an exemplary embodiment of the invention; and FIGS. 4A and 4B illustrate mapping of transport channel data onto physical layer channels in accordance with an exemplary embodiment of the invention.

DETAILED DESCRIPTION

Figure 1:
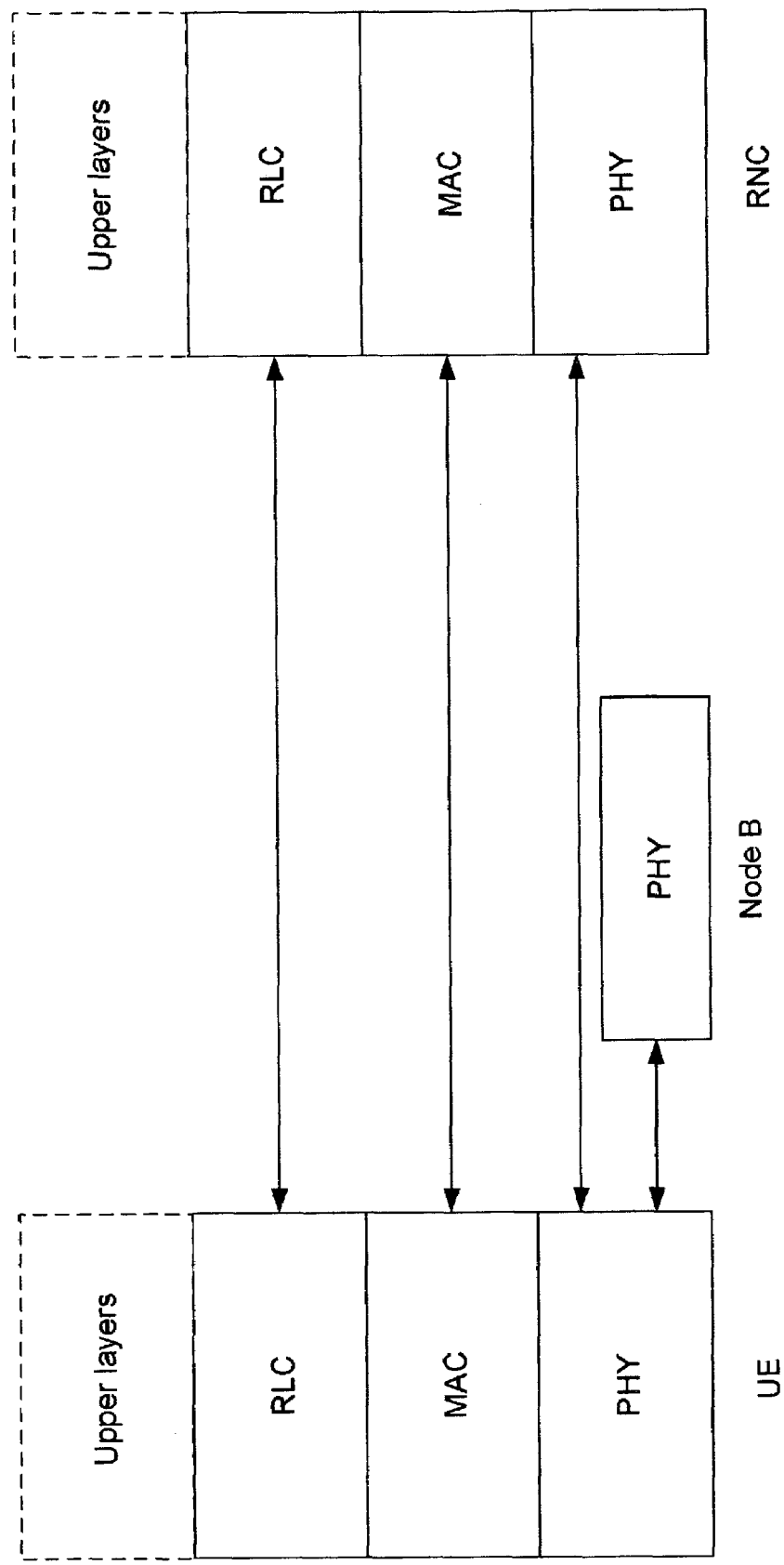
FIG. 1 illustrates a protocol stack for UMTS dedicated channels.

Although the principles of the invention are particularly well-suited for wireless communications systems based on the well-known Universal Mobile Telecommunication System (UMTS) standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein.

As used herein, the term "base station" may be synonymous to an access network, system equipment or Node-B, for example, each term of which may describe equipment that provides data connectivity between a packet switched data network (PSDN) such as the Internet, and one or more mobile stations. Additionally, the term "mobile station" where used herein, may be equivalent to a user, user equipment (UE), mobile and remote station, and may describe a remote user of wireless resources in a wireless communication network or a device providing data connectivity to a user, for example.

Exemplary embodiments of the present invention are directed to a MAC layer adapted for both scheduled and autonomous transmission modes, transport channels defined for the MAC layer, a method of transmitting from a user that combines scheduled and autonomous modes, as well as signaling in accordance to scheduled and autonomous modes. To provide a context for the exemplary embodiments of the present invention, the inventors provide an overview of these modes, as well as an overview of the protocol stack for UMTS dedicated channels.

Two modes of operation proposed for the uplink direction include: (a) a scheduled transmission mode; and (b) an autonomous transmission mode. In a scheduled mode of operation, the Node B determines which UE(s) transmit on the uplink, start time(s) for the UEs and duration of transmission(s). The Node B would typically do this based on some knowledge of the UE's buffer status (amount of data waiting) and available power. Additionally, a Node B scheduler would estimate the channel for each UE and the amount of "headroom" or margin available to the RoT threshold, in determining those UEs that can transmit and at what rate (or equivalently at what power).

In the autonomous mode, the Node B does not explicitly determine which UE(s) transmit on the uplink, start times and durations. In the autonomous mode, the Node B would typically specify an allowed data rate, either per UE or for all UEs, for example, based on dynamic RoT variations. The UEs can then transmit autonomously, but are subject to guidelines or rules such as the allowed rates specified by the Node B.

There are advantages and disadvantages to each mode. The scheduled mode may allow for reduced latencies in rate control, exploitation of fast channel quality variations, more precise control of the RoT and consequently, much better efficiency for a given constraint on the RoT. For example, if one desired to ensure that RoT did not exceed a threshold, X, more than 1% of the time, then, for that constraint, the achievable throughput with the scheduled mode will likely be higher than with autonomous mode.

Furthermore, the scheduled mode may be able to precisely control how many users transmit in a given time interval. In the uplink of CDMA systems, simultaneous transmissions interfere with each other; the scheduled mode may ensure that only one user transmits at a time. This may significantly enhance throughput.

There are drawbacks with the scheduled mode. Scheduling UEs in soft handoff without any coordination between Node Bs in the active set (i.e. Node Bs that will decode its data) could lead to RoT violations that may significantly impact other power controlled channels. For example, consider a UE in soft handoff with two Node Bs (#1 and #2). The UE may be scheduled by Node B #1 to transmit at rate R1. Without any coordination, Node B #1 may only be using its "headroom" or margin to the RoT constraint to determine R1. Node B #2 may schedule some other user in its cell, completely unaware that UE will transmit at rate R1 and cause additional and unpredictable interference to the user.

Additionally, fast coordination (i.e. exchange of information between Node Bs in the active set to ascertain which UE each of them is scheduling and what rate) is not considered feasible with the current architecture. This is because the only way the Node Bs can communicate with each other is through the RNC. The delay associated with this process is much longer than the typical scheduling intervals, the former being of the order of 100 ms, while the latter being of the order of 10 ms or lower. Thus, uncoordinated scheduling of UEs in soft handoff can result in RoT threshold violations, or alternatively, Node Bs will have to be very conservative in their usage of the available "headroom". The former approach can cause degradation in performance for voice users, while the latter would result in inefficient use of uplink capacity. Furthermore, if the UE simply follows the scheduling command of either Node B, then the active set Node B(s) for the UE that does not schedule the user will not attempt to decode its data. Therefore, the UE transmission will not derive the benefit of selection diversity (also known as macrodiversity). Some of these problems are alleviated if the Node Bs are made aware of the soft handoff (SHO) state of each UE and they can then factor this into their scheduling decisions.

The advantages of the autonomous mode of transmission may be at least two-fold. Firstly, when only a small amount of data needs to be sent (e.g. TCPs, ACKs or HTTP requests, for example) the latency and signaling overhead associated with the scheduled mode may be excessive. Secondly, in soft handoff, all Node Bs are aware that the UE can transmit at any time and therefore will attempt to decode the data. Therefore the UE can derive the benefit of selection diversity. In selection diversity, each Node B will decode the user's data and send it to the radio network controller (RNC). The RNC will "select" the replica that passed a CRC or equivalent frame quality test. Thus, the user's transmission may derive the benefit of diversity.

A drawback of the autonomous mode is that in simplex (non-soft handoff) mode with sufficient backlogged data, the achievable throughputs may be limited. This is because the Node B does not precisely control the transmission times of the UEs and, therefore, inherently, must follow a more conservative approach in assignment of allowable data rates to UEs. For example, in the selection of allowable rate assignments for users over the duration of the next t seconds, the Node B has to factor in the RoT constraint when a large number of UEs transmit.

FIG. 1 illustrates a current protocol stack for UMTS dedicated channels, based on UMTS Specification 25.301, Version 5.2.0., to provide context for the proposals herein as well as an overview of the protocol stack for UMTS dedicated channels. The layered architecture of UMTS with respect to a UE, Node B and RNC, for the case of dedicated channels is shown in FIG. 1, where "PHY" represents the physical layer, "MAC" represents the Medium Access Control Layer and "RLC" represents the Radio Link Control Layer.

UMTS defines three types of channels: logical, transport and physical. Logical channels may be characterized by the type of data they carry, e.g., user data or control data (layer 2 (L2) or higher control). A logical channel destined for one user may be referred to as a Dedicated Traffic Channel (DTCH) or a Dedicated Control Channel (DCCH). The input to the MAC layer may be one or more DTCHs/DCCHs.

Transport channels are intended to carry the data and are not concerned about whether the data carries DTCH or DCCH. The output of the MAC layer may be one or more transport channels. Each transport channel, also referred to as a dedicated channel (DCH), may have certain attributes that have been negotiated between the RNC and the UE at the time of call setup. Each DCH has certain attributes associated with it that may characterize the data rate and quality that is expected for the DCH. These attributes may also be negotiated at call setup time.

Physical channels are actual channels that carry data on the radio interface from the Node B to the UE. Physical channels destined to one user, also referred to as dedicated physical channels (DPCHs), may be characterized by the spreading factor and channelization code(s) selected. The physical layer takes the DCHs that the MAC gives it and maps the DCHs onto physical channels in a manner that is "consistent" with the attributes of each DCH. It is possible to have several DCHs (i.e. transport channels) mapped onto one DPCH (i.e. physical channel). It is also possible to have several DCHs mapped to several, different numbers, or different groups, of DPCHs. UMTS provides considerable multiplexing flexibility at the MAC and PHY layers for this purpose. MAC layers and layers above (upper level layers) are terminated at RNC and UE and not at the Node B for dedicated channels.

Enhanced MAC Layer

Figure 2:
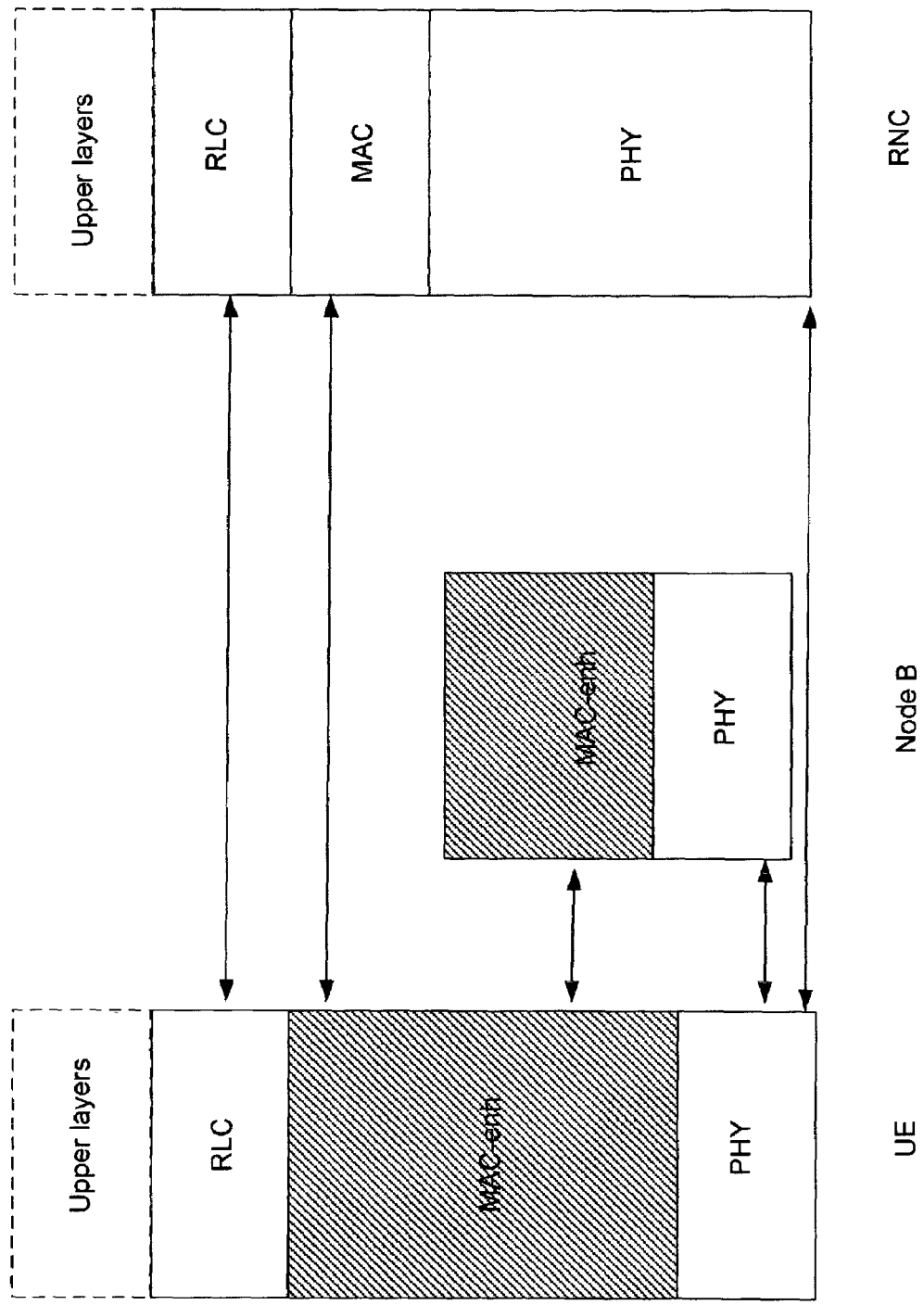
FIG. 2 illustrates a protocol stack for describing a MAC layer in accordance with an exemplary embodiment of the present invention.

FIG. 2 illustrates a protocol stack for describing a MAC layer in accordance with an exemplary embodiment of the present invention. An exemplary embodiment of the present invention is directed to a Medium Access Control (MAC) Layer called the Medium Access Control-Enhanced Layer (MAC-enh). The MAC-enh may have the following characteristics:

a) Termination points (e.g., communication points) are the UE and the Node B;

b) MAC-enh performs both scheduled tasks (scheduling) and rate supervision for scheduled mode, but only rate supervision for the autonomous mode. Scheduled tasks may include processing information about channel quality, power available at each UE, etc. Rate supervision for either mode could be embodied as a commanded rate, a suggested rate or a threshold;

c) MAC-enh at the UE performs a new task of multiplexing upper layer data into one or more transport channels defined for the scheduled and autonomous modes of operation, as to be described in further detail below;

d) If HARQ is used, then MAC-enh performs the HARQ task in conjunction with the PHY layer. Furthermore the MAC-enh can either have separate or common HARQ entities for scheduled and autonomous modes. An implication of having a common HARQ entity is that data transmitted using scheduled mode can be retransmitted and combined with the original transmission using autonomous mode, and vice-versa;

e) If simultaneous use of autonomous and scheduled modes are used with a common HARQ entity, then procedures outlined in co-pending U.S. Application Ser No. 10/285,413, entitled "A Flexible Transmission Method for Wireless Communications", filed Nov. 1, 2002, incorporated by reference in its entirety herein, may be employed;

f) MAC-enh at the UE continues to perform the tasks of the current UMTS MAC layer for legacy channels such as voice channels; and g) MAC-enh can perform priority scheduling to determine which data should go on the scheduled transport channel and which should go on the autonomous transport channel (these transport channels are defined in further detail below).

Transport Channels for MAC-Enh

In accordance with the exemplary embodiments of the invention, two new transport channels (DCHs) are defined, one for scheduled (-SCH) mode of operation and the other for autonomous (-AU) mode of operation. These will be hereafter referred to as E-DCH-SCH for enhanced DCH in scheduled mode, and E-DCH-AU for enhanced DCH in the autonomous mode. The E-DCH-SCH and E-DCH-AU transport channels may have different attributes and methods of control.

A transmission time intervals (TTI is an attribute of transport channels in UMTS. E-DCH-SCH can have a shorter TTI (less than 10 ms) than currently allowed in UMTS. EDCH-SCH may be intended to carry delay-tolerant, error-tolerant data, such as web-browsing traffic, electronic mail, file transfers, etc. The transmission attributes (selected data rate for transmission, coding rate, modulation etc.) would typically be selected by the Node B, as envisaged for the scheduled mode of operation.

E-DCH-AU can have TTIs allowed currently in UMTS, e.g. 10 ms and multiples thereof. The E-DCH-AU would typically be used for short transfers of data (several tens of bytes) or for delay intolerant data such as TCP, ACK, HTTP transfer requests, etc. The transmission attributes of this transport channel can be negotiated with RNC at the time of call setup, as is done currently with DCHs. Alternatively, the RNC can provide a super-set of attributes, where the super set, for example, consists of all possible data rates without considering the data rates that may practically be usable at the Node B based on its current load and interference conditions. The Node B can control the valid subset from that superset with time as previously described above when autonomous mode was introduced.

In soft handoff (SHO) situations, the RNC can renegotiate the allowed set of transmission attributes to ensure that all the Node Bs involved can support them. Alternatively, a super set (as described in the previous paragraph) may be provided to the UE and each Node B can control the subset. In such an implementation of the autonomous mode, the UE may take a conservative approach and use the intersection of the two sets, rather than the union. That is, it would regard the set of allowed data rates to be only those rates that all the Node Bs in the soft handoff active set can support. In a case when E-DCH-AU attributes are set and controlled by the RNC, then the E-DCH-AU simply reduces to an existing DCH definition. That is, the UE will simply select the transmission attributes autonomously based on the set as is done today and the Node B does not control this set. Further, although a scenario has been described above where short transactions or delay intolerant data go on E-DCH-AU, while other data goes on E-DCH-SCH, this decision may be completely at the discretion of the MAC-enh entity.

Yet further, the MAC-enh can either draw from the same RLC buffers for transmission on both the E-DCH-AU or E-DCH-SCH or from different RLC buffers. The advantage with drawing data from a common RLC buffer for both E-DCH-SCH and E-DCH-AU may be explained as follows. Suppose in one implementation, scheduled mode is not allowed for users in soft handoff. Thus, the MAC-enh switches to transmitting the RLC data on the E-DCH-AU. At the RLC and higher layers, the service is unaware of the change and service continues without any changes.

FIG. 3 illustrates multiplexing performed by the MAC layer of FIG. 2 in accordance with an exemplary embodiment of the invention. In FIG. 3, RLC data may be mapped onto E-DCH-SCH and E-DCH-AU, as shown. Other data from existing MACs (e.g., voice) may be mapped onto conventional or currently existing transport channels (DCHs) as is known. FIG. 3 is just one exemplary configuration, as more than one DCH may be possible at the output of the MAC-enh.

Additionally, data from the upper level layers (RLC) may be mapped to the E-DCH-SCH or E-DCH-AU based on a trigger. For example, delay-tolerant, error-tolerant data, such as web-browsing traffic, electronic mail, file transfers, etc., may be a trigger that this type of data should be multiplexed onto the E-DCH-SCH. Conversely, delay intolerant data such as TCP, ACK, HTTP transfer requests, etc may be a trigger that this type of data should be multiplexed onto the E-DCH-AU. The SHO status of the user may be another trigger, where scheduled mode, and hence the E-DCH-AU, is not used when the UE is in SHO, as described above. Further, use of an E-DCH-SCH or E-DCH-AU may be trigger based on a power requirement, i.e., if the data rate allocated by the Node B is lower, a E-DCH-AU transport channel may be used, with E-DCH-SCH being used for higher allocated data rates, for example.

FIGS. 4A and 4B illustrate mapping of transport channel data onto physical layer channels in accordance with an exemplary embodiment of the invention. In UMTS, the physical layer takes the transport channels E-DCH-AU, E-DCH-SCH and any other existing DCHs as input and maps them onto physical channels. The physical channels may also be divided into groups with each group being associated with one or more transport channels.

In the example of FIG. 4A, two groups, illustrated by ovals, of physical channels are shown. One group is for E-DCH-SCH; the other group is for E-DCH-AU plus any other DCHs present. Each group may be associated with a set of channelization codes and spreading factor(s) (e.g., physicals channels) and it is the job of the physical layer (PHY) to map the bits from the individual transport channels into the group. This mapping should be consistent with the attributes of the transport channel.

For example, assume that an existing DCH such as voice carries 5 bits with a very stringent error rate requirement, and an E-DCH-AU transport channel carries 3 bits at lesser error rate requirements, for a total of 8 data bits. The PHY layer should create sufficient room to map all of the 5 bits from voice DCH to a physical channel (codes) to satisfy to more strict error rate requirements. If the coding rate is ⅓, the physical layer coded bits would equal 15 bits for voice DCH and 9 bits for the E-DCH-AU, for a total of 24 coded bits. If the physical channel, which as per the figure is shared by those two voice DCH and E-DCH-AU, can only accommodate 20 coded bits, all 15 coded bits associated with voice DCH would be mapped into the physical channel, but only 5 of the 8 coded bits for E-DCH-AU, since it has lesser error rate restrictions In an exemplary embodiment, a preferred mode for the E-DCH-SCH transport channel to have its own group of physical channels, with no other transport channel contributing to that group, as shown in both FIG. 4A and FIG. 4B. Therefore, number of bits allowed for transmission on to the physical channel for E-DCH-SCH does not depend on any other DCH/E-DCH-AU. However, the E-DCH-AU can be multiplexed on to the same group of physical channels as other DCHs, as in FIG. 4A, or may also have its own group of physical channels (FIG. 4B).

The method of multiplexing of FIGS. 4A and 4B may have slight differences in terms of the ease with which certain types of HARQ combining can be done. Consider the following examples. Suppose HARQ is supported for transmissions of E-DCH-AU data and the HARQ technique requires the same number of coded bits to be sent at the time of retransmission, then the multiplexing embodiment of FIG. 4B may guarantee that this is possible. This would be possible because the E-DCH-AU would be mapped to a dedicated set of physical channels, separate from other DCHs. Therefore, the number of channel bits available for E-DCH-AU would be independent from the required total channel bits for other DCHs.

In the alternative of FIG. 4A, this would not be the case, since the E-DCH-AU and other DCHs share the same set of physical channels. However, this is seldom a serious problem, because most HARQ methods can still perform combining without having the same number of coded bits sent at every retransmission. The actual implementation and performance may be slightly different.

Signaling of Control Information

For E-DCH-SCH and its associated physical channels, signaling may be performed as described in the co-pending U.S. Application (serial number unassigned), by the inventors entitled "Signaling Methods for Wireless Communication Systems", filed Feb. 14, 2003, incorporated by reference in its entirety herein. For example, user control information, such as buffer status information, reverse pilot channel transmit power information, and bits related to the soft handoff (SHO) status of the user, may be appended as a header to a data block, and the data block and header may be encoded and transmitted as a signaling message from the user. Signaling messages may be transmitted in both scheduled and autonomous modes, for example For E-DCH-AU, uplink signaling may also be needed. When E-DCH-AU is multiplexed with other DCHs onto the same group of physical channels (FIG. 4A), then the current method of Layer 1 signaling used in UMTS can be reused with little or no variation. This signaling may be carried on the UL Dedicated Physical Control Channel (DPCCH). When E-DCH-AU is multiplexed onto a separate group of physical channels (FIG. 4B), then signaling using the UL-DPCCH directly may not be possible. However, several options may be used: (i) add another UL-DPCCH on a different code channel to carry information about the E-DCH-AU transmission; or (ii) time multiplex the control information for E-DCH-AU on to the same physical channels that are used to carry its information.

Since both scheduled and autonomous modes of operation exist, another option would be to not use the scheduled mode of transmission when the UE is in a soft handoff (SHO) state. Autonomous mode may be used regardless of whether the UE is in soft handoff or not. Since the Node Bs do not know whether the UE is in soft handoff state or not, some signaling to let the Node B know that it has entered soft handoff state may be needed. The signaling message to the Node B, which would provide SHO status of the UE, may be generated and transmitted as described above in our co-pending patent application "Signaling Methods for Wireless Communication Systems", for example. For example, the SHO status can be communicated to the Node B in a signaling message sent over a physical channel (in the PHY layer). In other words, the Node B can decode a coded data block (the signaling message) that contains SHO status, and interpret the bits indicating the SHO status of the UE, when received in the physical layer.

Alternatively, the RNC may indirectly inform the Node B, via a backhaul (called the Iub link in UMTS terminology) between the RNC and the Node B such as a T1/E1 line or a wireless link, for example, when it adds a soft handoff connection that the UE is in soft handoff. The UE communicates SHO status to the RNC via higher layer signalling, through the Node B. The Node B cannot interpret bits indicating SHO status since it is a higher layer message that is only terminated at the RNC. Thus, once the RNC interprets these bits, it may inform a Node B serving the UE that the UE is in a SHO state, via the backhaul connection. Similarly when the RNC tears down a soft handoff connection, it may inform involved Node Bs that the UE is now no longer in a soft handoff state.

The exemplary embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the following claims.

What is claimed is:

1. A medium access control layer (MAC) having termination points at a base station and at user, comprising:
   means for scheduling tasks at the base station; and
   means for multiplexing upper layer data into separate first and second channels at the user; wherein
   the first channel is a transport channel configured for scheduled operation mode and used only when the user is in a scheduled transmission mode,
   the second channel a transport channel configured for autonomous transmission mode and used only when the user is in an autonomous transmission mode, and
   the means for scheduling performs priority scheduling of tasks at the base station.

2. The MAC layer of claim 1, wherein the means for multiplexing maps data from a common radio link control layer (RLC) buffer onto both the first and second channels.

3. The MAC layer of claim 1, wherein the means for multiplexing maps data from one radio link control layer (RLC) buffer onto the first channel and from another RLC buffer onto the second channel.

4. The MAC layer of claim 1, wherein the means for scheduling tasks further assigns higher priority data to the first channel and lower priority data to the second channel.

5. A method of mapping transport channels in a MAC layer onto physical channels of a physical layer at a user, comprising:
   inputting a first transport channel configured for scheduled operation mode and used only when the user is in a scheduled transmission mode;
   mapping said first transport channel to a first group of physical channels;
   inputting a second transport channel configured for autonomous transmission mode and used only when the user is in an autonomous transmission mode;
   mapping said second transport channel to a second group of physical channels that are not associated with said first transport channel.

6. The method of claim 5, further comprising:
   mapping additional transport channels not dedicated for either scheduled or autonomous modes to said second group of physical channels.

7. The method of claim 5, further comprising:
   mapping additional transport channels not dedicated for either scheduled or autonomous modes to a third group of physical channels not associated with either of said first transport channel or said second transport channel.

8. A method of transmitting information from a user, comprising:
   multiplexing upper layer data onto a first transport channel configured for scheduled operation mode and used only in a scheduled transmission mode and onto a second transport channel configured for autonomous transmission mode and used only in an autonomous transmission mode;
   mapping the first and second transport channels to groups of physical channels for encoding, so that a first group of physical channels is designated for carrying bits of data from said first transport channel, and a second group of physical channels is designated for carrying bits of data from said second transport channel; and
   transmitting the data on the first and second groups of physical channels.

9. The method of claim 8, further comprising:
   transmitting a signaling message over at least one of the physical channels to the base station, wherein said signaling message includes a soft handoff status of the user.

10. The method of claim 8, further comprising:
    transmitting a signaling message from the user in a medium access control (MAC) layer to a radio network controller (RNC), the RNC transmitting soft handoff status of the user to one or more base stations involved in the soft handoff.

11. A method of multiplexing data in a medium access control (MAC) layer of a user, comprising:
    the MAC layer mapping data from upper level layers to a first transport channel configured for scheduled operation mode and used only for a scheduled transmission mode of operation and to a second transport channel configured for autonomous transmission mode and used only for an autonomous transmission mode of operation, the user's MAC layer multiplexing upper level data into one or more of the first and second transport channels based on a trigger.

12. The method of claim 11, wherein said trigger is related to one of a type of data, a soft handoff status of the user and a transmit power requirement.

13. A transport channel of a medium access control (MAC) layer, comprising:
    the transport channel receiving multiplexed data from the MAC layer that is delay tolerant and error tolerant, the transport channel used by the MAC layer only when a user has received a scheduling grant and is in a scheduled mode of operation, the transport channel characterized by a transmission time interval less than 10 ms, and subject to one or more of fast scheduling, adaptive data rate selection and Hybrid Automatic Repeat Request (H-ARQ) processes from a controlling entity.

14. The transport channel of claim 13, wherein multiplexed data from the MAC layer that is delay tolerant and error tolerant is selected from at least one of web-browsing traffic, electronic mail and file transfers.

15. A transport channel of a medium access control (MAC) layer, comprising:
    the transport channel receiving multiplexed data from the MAC layer that is delay intolerant, the transport channel used by the MAC layer only when a user is operating in an autonomous transmission mode, the transport channel characterized by a transmission time interval of at least 10 ms and multiples thereof, and subject to one or more of fast scheduling, adaptive data rate selection and Hybrid Automatic Repeat Request (H-ARQ) processes from a controlling entity.

16. The transport channel of claim 15, wherein multiplexed data from the MAC layer that is delay intolerant is selected from at least one of TCP data, ACK data and HTTP transfer requests.

* * * * *